United States Patent [19]

DesJardins

[11] Patent Number: 5,570,099
[45] Date of Patent: Oct. 29, 1996

[54] TDOA/FDOA TECHNIQUE FOR LOCATING A TRANSMITTER

[75] Inventor: Gerard A. DesJardins, Endicott, N.Y.

[73] Assignee: Loral Federal Systems Company, McLean, Va.

[21] Appl. No.: 138,154

[22] Filed: Oct. 15, 1993

[51] Int. Cl.⁶ .............. G01S 3/16; G01S 5/04; G01S 15/00; G01S 3/80
[52] U.S. Cl. .............. 342/378; 342/420; 342/444; 342/449; 367/100; 367/125
[58] Field of Search .............. 342/378, 189, 342/420, 449, 444, 465, 445; 367/100, 125, 126

[56] References Cited

U.S. PATENT DOCUMENTS

| | | | |
|---|---|---|---|
| 3,594,718 | 7/1971 | Black et al. | 342/378 |
| 3,808,594 | 4/1974 | Cook | 343/17.2 |
| 4,176,351 | 11/1979 | DeVita et al. | 343/9 R |
| 4,198,704 | 4/1980 | Munson | 342/378 |
| 4,616,227 | 10/1986 | Homma et al. | 342/25 |
| 4,823,272 | 4/1989 | Inselberg | 364/461 |
| 4,853,701 | 8/1989 | Drabowitch | 342/139 |
| 4,872,012 | 8/1988 | Chabries | 342/25 |
| 4,999,635 | 3/1991 | Niho | 342/25 |
| 5,043,734 | 8/1991 | Niho | 342/25 |
| 5,058,024 | 10/1991 | Inselberg | 364/461 |

Primary Examiner—Gregory C. Issing
Attorney, Agent, or Firm—William H. Steinberg

[57] ABSTRACT

A process for locating a transmitter in which the signal is received by first and second receivers and then processed by respective analog to digital converters and filtered to yield first and second digital signals. There is relative motion between at least one of the receivers and the transmitter. A compression process local to the first receiver compresses the first digital signal. The result of the compression process is transmitted to a cross-correlation unit which is local to the second receiver and coupled also to receive the second digital signal. Locally to the first receiver, correction factors for the solution to the cross-correlation function are determined and transmitted to a correction unit at the second receiver site which applies the correction factors to the solution of the cross-correlation function. The location of the transmitter is determined based on time difference of arrival and frequency difference of arrival results output from the correction unit. If there is no relative motion between the transmitter and any receiver, then three receivers are necessary to locate the transmitter. The outputs are analog to digital converted and filtered to yield first, second and third digital signals. A compression process at the first receiver site compresses the first digital signal. The compressed signal data is transmitted to convolution units local to the second and third receivers and convolved with the second and third digital signals, respectively. Then correction factors for both convolution units are determined local to the first receiver and transmitted to correction units at both the second and third receiver sites. The location of the transmitter is then determined based on two time difference of arrival results.

35 Claims, 3 Drawing Sheets

TDOA/FDOA TECHNIQUE FOR LOCATING A TRANSMITTER

The invention relates generally to radar, and deals more particularly with an improved technique using signal Time Difference Of Arrival (TDOA) and/or Frequency Difference Of Arrival (FDOA) measured at two or more spaced receiver sites to determine the location of a transmitter.

It was previously known that TDOA and FDOA of radio or microwave signals measured at two or more separated receiver sites can be used to locate the transmitter. TDOA is a result of the path length or range difference between the transmitter and each receiver site, properties of the propagation medium and the corresponding propagation time difference between the transmitter and the receiver sites. If the transmitter site or either of the receiver sites is moving, a signal frequency shift or doppler shift occurs due to the motion. The FDOA is based on the characteristics of the propagation medium and the locations and velocities of the transmitter and receiver sites.

The delay difference $\tau=(R_1-R_2)/c$

The frequency difference $v=f(\dot{R}_1-\dot{R}_2)/c$.

Here, $R_i$ is the range from the transmitter to the ith receiver, $\dot{R}_i$ is time rate of change of range or relative velocity between the transmitter and receiver, c is the speed of propagation, and f is the transmitter frequency.

The $\tau$ measurement defines a contour on the surface of the earth. If there is a third receiver site, then two independent $\tau$ contours can be determined. The intersection of two such contours establishes the transmitter location. The $v$ measurement also defines a contour on the surface of the earth. Two independent $v$ measurements can be obtained using three receiver sites provided at least two of the receiver sites are moving. The intersection of two such contours establishes the transmitter location when the transmitter is stationary. When the transmitter is moving, two $v$ measurements can be used to estimate its velocity if its location is known. In this case, receive site motion is not required. When the transmitter is stationary and at least one of two receiver sites is moving, a single $\tau$ and a single $v$ can be determined and the two receiver sites are sufficient to locate the transmitter.

Figure 1:
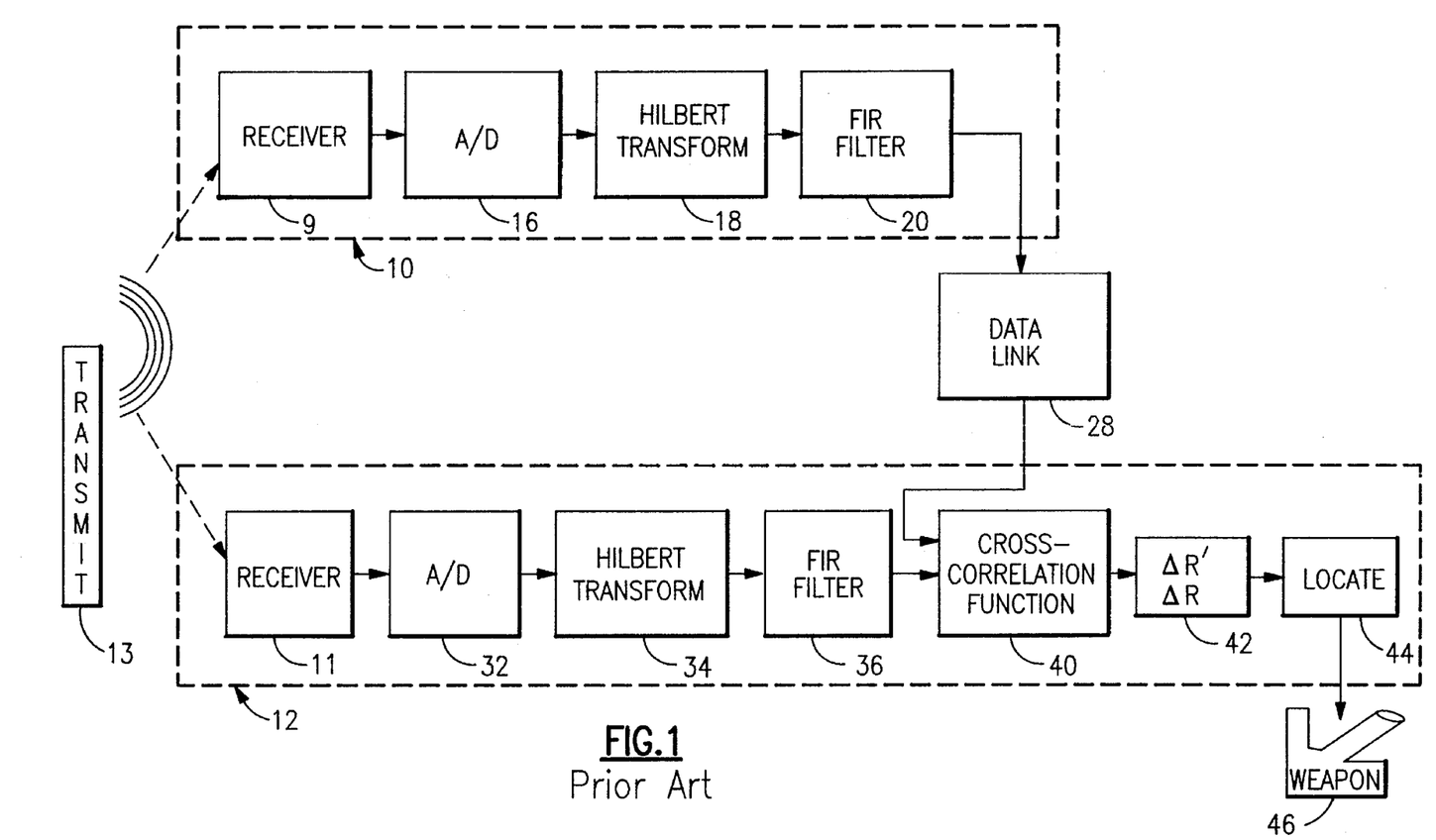
FIG. 1 is a block diagram according to the Prior Art of a system for determining the location of a transmitter using TDOA and FDOA from two spaced receiver sites one or more of which are moving relative to the transmitter.

A prior art technique is illustrated in FIG. 1. The transmitted signal is received by a receiver 9 at a receiver site 10 and by a receiver 11 at a spaced receiver site 12. Either or both receiver sites are moving relative to the transmitter 13.

The signal received at site 10 is A/D converted by process 16 into a "real sampled signal". The sampling rate is the minimum required to accurately represent the received signal and to prevent aliasing. Then, the real sampled signal is transformed into a complex baseband signal sampled at one half the real rate using a "Hilbert" transformation" or equivalent process 18.

The general form for a real signal is $$\text{real signal} = a(t)\cos(\omega t) + b(t)\sin(\omega t)$$
$$= \frac{1}{2}(a(t)+jb(t))e^{j\omega t} + \frac{1}{2}(a(t)-jb(t))e^{-j\omega t}$$

The Hilbert transform effectively moves one of the complex spectra to baseband and filters out the other. Hilbert transformation is further described in a publication entitled "Digital Signal Processing" published 1975 by A. V. Oppenheim and R. W Schafer, Chapter 7, and this chapter is hereby incorporated by reference as part of the present disclosure.

Then, the complex signal is passed through a finite impulse response (FIR) filter 20. The FIR filter bandwidth is tailored to match the signal bandwidth to provide maximum noise rejection while permitting the transmitted signal to pass through with minimal change. The output signal of the FIR filter is defined as follows:

$$S_{out}(m) = \sum_{n=-N}^{n=+N} a_n S_{in}(m+n)$$

where 2N+1 is the number of filter taps and the $a_n$ are the filter coefficients. FIR filtering is further described in a publication entitled "Digital Signal Processing" by Oppenheim and Schafer, Chapter 4 and Chapter 4 is hereby incorporated by reference as part of the present disclosure.

The resultant filtered output is transmitted to site 12 via data link 28. The sample rate that was selected is the minimum consistent with accurate representation of the signal. Use of the minimum sample rate is important because minimization of the data link transmission time is critical to the rate at which the transmitter can be located. The data link comprises a radio transmitter (not shown) at site 10, air waves, and another radio receiver (not shown) at site 12.

In the prior art, the real and imaginary parts of the signal samples are transmitted to site 12. The number of bits transmitted per complex sample depends on the dynamic range of the data. Typically, a minimum of 16 bits per sample, 8 real and 8 imaginary, are used.

While site 10 performs the A/D conversion, Hilbert transformation and FIR filtering, site 12 performs identical A/D conversion 32, Hilbert transformation 34 and FIR filtering 36 on the signal that the receiver 11 receives except the sampling rate of the A/D converter 36 at site 12 will be larger, twice that at site 10. The higher sampling rate provides for greater location accuracy and them is little cost because the resultant data is not transmitted anywhere.

Next, a process 40 generates a complex cross-correlation (or "cross-ambiguity") surface $\chi$ at site 12 using the outputs of FIR filters 20 and 36:

$$\chi_{12}(k,l) = \frac{1}{N}\sum_{1}^{N} s_1(n) \times \bar{s}_2(I \times n - k)e^{-j(l \times n \times \Delta)}$$

where n is the complex sample index, k is the $\tau$ index (i.e. the range of delays over which the cross-ambiguity function will be computed), l is the $v$ index (i.e. the range of frequencies over which the cross-ambiguity function will be computed), $s_1$ is the signal data collected at site 10, $s_2$ is the signal data collected at site 12, I is the ratio of the final sample rates at the two sites (2 over 1), $\Delta$ is the Fourier Transform angle increment, and the bar denotes conjugation.

Next, the $\tau$ and $v$ of the peak of the ambiguity surface are found as follows. First, the complex cross-ambiguity surface is magnitude squared and the coordinates of the highest sampled point $(k_{pk}, l_{pk})$ are found. Then a two dimensional polynomial centered on the highest point is fit to the magnitude squared surface. The peak occurs where the first derivatives of the polynomial along the k and l axes axe zero. $\tau$ and $v$ axe computed at the peak as:

$$\tau_{peak} = (k_{peak} + \delta k)\frac{1}{F_s}$$

$$v_{peak} = (l_{peak} + \delta l)\Delta \times F_s$$

where $\delta k$ and $\delta l$ are the peak offsets from the highest point and $F_s$ is the complex sample frequency. $\phi$ is found by determining the phase of the ambiguity surface at $(\tau_{pk}, v_{pk})$. Then, a process 42 uses the $\tau_{peak}$, $v_{peak}$ and $\phi$ values to determine the difference in range ($\Delta R$) and difference in relative velocity ($\Delta \dot{R}$). A process 44 determines the intersections of the these two contours as the location of the transmitter. If contours from other site pairs are available, they are combined with those computed at site 12 in process 44 as well.

There are several approaches for finding the intersection of a $\Delta R$ and a $\Delta \dot{R}$ contour. A simple one is to travel along the $\Delta R$ contour in steps computing a $\Delta \dot{R}$ at each step. An initial estimate of the intersection point is obtained when the difference between the computed $\Delta \dot{R}$ and the measured $\Delta \dot{R}$ becomes small. Then, the sensitivities of $\Delta R$ and $\Delta \dot{R}$ to the transmitter location are computed and together with the differences between the measured and computed $\Delta R$'s and $\Delta \dot{R}$'s are used to compute an update to the transmitter position. The update is added to the initial estimate and the process is repeated until the updates become small.

It was also known in the prior art to transmit from site 10 to site 12 only the sign of the real and imaginary parts or equivalently the sign of the real sample data. While this "one bit clipping" technique minimizes the amount of data that must be transmitted to site 12 and therefore the time required to locate the transmitter, the gross approximation of each sample leads to substantial errors in the result of the cross-correlation function. Consequently, there are substantial errors in determining the location of the transmitter.

Accordingly, a general object of the present invention is to provide a system and method for determining the location of a transmitter using TDOA and/or FDOA which system and method provide an accurate result yet minimize the amount of data that must be transmitted from one receiver site to the other.

SUMMARY OF THE INVENTION

The invention resides in a process for locating a transmitter using at least two receiver sites where there is relative motion between at least one of the receiver sites and a stationary transmitter or using at least three receiver sites where there is no relative motion. In the former case, the signal is received by first and second receivers and then processed by respective analog to digital converters to yield first and second digital signals. Then, a compression process local to the first receiver compresses the first digital signal or another digital signal derived from the first digital signal. The result of the compression process is transmitted to a cross-correlation unit which is local to the second receiver and coupled also to receive the second digital signal or another digital signal derived from the second digital signal. The cross-correlation unit generates and solves a cross-correlation function based on the compressed signal data and the second digital signal or other digital signal derived from the second digital signal. Locally to the first receiver, correction factors for the solution to the cross-correlation function are determined and transmitted to a correction unit which applies the correction factors to the solution of the cross-correlation function. The location of the transmitter is determined based on time difference of arrival and frequency difference of arrival results output from the correction unit.

In the case of three receiver sites and no relative motion the process is as follows: The outputs of each of the first, second and third receivers is analog to digital converted to yield first, second and third digital signals. A compression process at the first receiver site compresses the first digital signal or another digital signal derived from the first digital signal. The compressed signal data is transmitted to a convolution unit local to the second receiver and convolved with the second digital signal or another digital signal derived from the second digital signal. The compressed signal is also transmitted to a convolution unit local to the third receiver and convolved with the third digital signal or another digital signal derived from the third digital signal. Then correction factors for both convolution units are determined local to the first receiver and transmitted to both correction units. Each of the correction units then applies the correction factors to an output of the associated convolution unit to yield a corresponding time difference of arrival. The location of the transmitter is then determined based on the two time difference of arrival results.

There are various ways to compress the data including representing each digital signal (filtered or unfiltered) by the quadrant in which the phase resides. This requires only two bits per signal. The correction factors determine the modification to the output of the cross-correlation unit necessary to correct for lack of magnitude and approximation in phase information in this example of the compressed signal. The correction factors are determined at the compression site for use at the other site(s).

DETAILED DESCRIPTION OF THE PREFERRED EMBODIMENTS

Figure 2:
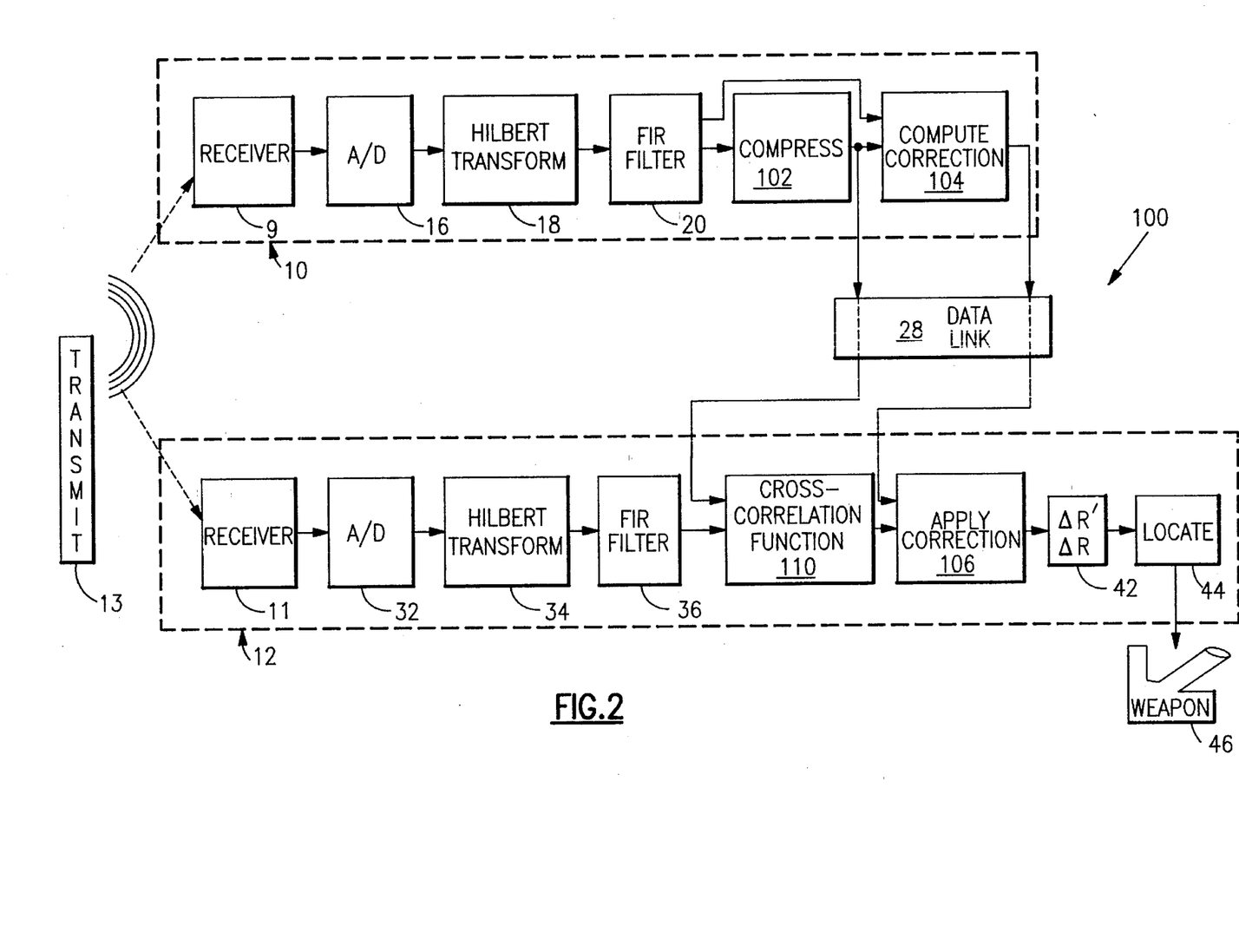
FIG. 2 is a block diagram according to the present invention of a system for determining the location of a transmitter using TDOA and FDOA from two spaced receiver sites one or more of which are moving relative to the transmitter.

FIG. 2 illustrates a system generally designated 100 according to the present invention for determining the location of the transmitter 13. System 100 includes receivers 9 and 11, A/D converters 16 and 32, Hilbert transformation processes 18 and 34, and FIR filters 20 and 36 at sites 10 and 12, respectively, the data link 28, the $\tau$ and $v$ conversion process 42, and transmitter location process 44 of prior art FIG. 1. However, three new processes are added in system 100—compression 102, compute correction 104, and apply correction 106. Also, a different complex cross-correlation function is generated and analyzed by process 110.

The general strategy of system 100 is as follows. The purpose of the compression process 102 is to reduce the number of bits used to represent the data resulting after the FIR filtering process 20, and consequently the amount of data that must be transmitted to site 12. As noted above, the time of transmission from site 10 to site 12 is a limiting factor and data compression can reduce this time considerably.

Two embodiments of the compression process 102 according to the present invention are as follows. One approach is to reduce the number of bits used to represent the real and imaginary data words. Alternatively, the real and imaginary representation can be convened to magnitude and phase and the number of bits used to represent the magnitude and phase reduced. Ultimately, the minimum number of bits required to represent a complex data word using the real and imaginary representation is two, one bit for the real part and one bit for the imaginary. Equivalently, for the magnitude and phase representation, two bits are used to represent the quadrant of the phase; quadrant 1 is 0–89 degrees, quadrant 2 is 90–179 degrees, quadrant 3 is 180–269 degrees, and quadrant 4 is 270–359 degrees in the complex plane. Magnitude information is preserved only if data block scaling is used.

For any compression approach that reduces data word precision to a few bits, error correction is necessary because the compression process sacrifices information and thus introduces error in measured $\tau$, $\nu$, and $\phi$.

The corrections are determined by correlating the compressed signal data with the actual FIR sampled signal at site 10. Thus, the data which is transmitted to site 12 is not the entire sampled signal received at site 10 but the compressed data and the correction factors for $\tau$, $\nu$ and $\phi$.

Next, a new complex cross-correlation function based on the FIR sampled signal from site 12 and the compressed data from site 10 is generated and analyzed by process 110. The results are $\tau$, $\nu$, and $\phi$ values representing the differences in delay, frequency and phase between sites 10 and 12. However, because of the errors in the data introduced by the compression step, the values for $\tau$, $\nu$ and $\phi$ determined by the cross-correlation function require correction. It should be noted that the corrections for $\tau$, $\nu$ and $\phi$ determined at site 10 using the output of FIR filter 20 are the same as the correction factors required for $\tau$, $\nu$ and $\phi$ determined by the cross-correlation function at site 12 using the output of FIR filter 36. This is because the errors introduced by compression are essentially independent of receiver location. Thus, apply correction process 106 adds the correction factors for $\tau$, $\nu$ and $\phi$ received from site 10 to the $\tau$, $\nu$ and $\phi$ values generated by process 110 at site 12. Then, a process 42 uses the resulting values of $\tau$, $\nu$ and $\phi$ to determine the difference in range between the transmitter and each receiver site and the difference in relative velocity between the transmitter and each receiver site. Then, a process 44 determines the intersection of the two contours corresponding to these two differences and that is the location of the transmitter. Using this invention, considerable savings in data transfer time can be obtained with little degradation in transmitter location accuracy.

The following is a more detailed description of three embodiments of the compression process 102, compute correction process 104, generate and analyze complex cross-correlation function process 110 and apply correction process 106. A phase only compression process and corresponding compute correction process and cross-correlation process are described first. Compression process 102 consists of two steps. First, the phase $\theta$ ($-\pi \leq \theta < \pi$) of each complex signal sample output from FIR filter process 20 is measured. Then $\theta$ is quantized (into $\hat{\theta}$) as follows:

$$\hat{\theta} = \text{sign}(\theta) \times \text{Integer}\left[\frac{|\theta| \times 2^{M_\theta - 1}}{\pi} + 0.5\right];$$

if $\hat{\theta} = 2^{M_\theta - 1}$, then $\hat{\theta} = -2^{M_\theta - 1}$.

where $M_\theta$ ($\geq 1$) is the number of bits used to represent each $\theta$. Then, the quantized phase indicating which sector the phase resides is transmitted to site 12 via data link 28.

As noted above, the process 102 of compressing the signal data as described above results in errors in $\tau$, $\nu$, and $\phi$. However, a correction to the errors for each of $\tau$, $\nu$, and $\phi$ is computed by the compute correction process 104.

The first step in compute correction process 104 is to generate a cross-correlation surface using the quantized phase data resulting from the compression and the uncompressed sampled signal from FIR filter 20. This surface is generated as follows:

$$\chi(k,l) = \frac{1}{N} \sum_{1}^{N} e^{j(\hat{\theta}(n)\pi/2^{M_\theta - 1})} \times \bar{s}_1(l \times n - k) e^{-j(l \times n \times \Delta)}$$

where $e^{j(\hat{\theta}(n)\pi/2^{M_\theta - 1})}$ is the quantized phase representation of the compressed signal, $\bar{s}_1$ represents the conjugate of the output of FIR filter 20, n is the complex sample index, k is the $\tau$ index ($-2 \leq k \leq 2$) and l is $\nu$ index ($-2 \leq l \leq 2$). Conjugation is the process of switching the sign of the imaginary part. Next, the complex surface is magnitude squared and the peak of the magnitude squared surface is found as described above. $\tau_{correction}$ and $\nu_{correction}$ are the $\tau$ and $\nu$ peak locations respectively. $\phi_{correction}$ is the phase of the complex surface at (k=0,l=0).

The corrections we transmitted over data link 28 with the quantized phase data. It should be noted that the present invention provides a significant reduction in the number of signal data bits which must be transferred via the data link 28 because neither the magnitude of each FIR sampled signal nor a close approximation of the phase is sent. In the prior art, a complex signal sample may require 16 bits (i.e. 8 real, 8 imaginary). However, according to the present invention, when $M_\theta$ equals 2, the number of signal bits which must be transmitted is reduced by 8:1 i.e. only those required to indicate the quadrant of the phase. As a result, the time needed to transfer the data to site 12 is reduced or alternatively, a data link with less capacity can be used to transfer the data.

After the compressed signal and corrections are transmitted to site 12, process 110 generates a new, complex cross-correlation surface $\chi_{12}(k,l)$ which is based on the quantized phase information from site 10 and the conjugate of the FIR sampled signal from site 12. (The correction factors are not used by process 110.)

$$\chi_{12}(k,l) = \frac{1}{N} \sum_{1}^{N} e^{j(\hat{\theta}(n)\pi/2^{M_\theta - 1})} \times \bar{s}_2(l \times n - k) e^{-j(l \times n \times \Delta)}$$

Note that the cross-correlation function 110 differs from the cross-correlation function 40 in that $s_1$ in cross-correlation function 40 is replaced by the quantized phase information of the compressed signal. Also, it should be noted that because of the errors and gross approximations in the quantized phase information from the compressed signal, the error in the $\tau$, $\nu$, and $\phi$ values generated by the cross-correlation function of process 110 may be increased significantly. Consequently, correction is required. Compute correction process 106 adds the corrections to $\tau$, $\nu$ and $\phi$ received from site 10 to the respective values determined by the modified ambiguity function to yield accurate values for $\tau$ $\nu$, and $\phi$. Then, processes 42 and 44 are performed as above.

To use the above described approach for compression which includes some magnitude and some phase information, processes 102, 104 and 110 are changed as described below. The phase $\theta$ is quantized as previously described. The magnitude is quantized as:

$$\hat{a}(n) = \text{Integer}\left[\frac{a(n) \times (2^{M_a} - 1)}{\max[a]} + 0.5\right]$$

$$\forall n$$
where $\max[a] = \max\ [a(n)]$.

Here, $M_a + M_\theta$ is the number of bits used to represent each signal sample. Each complex signal sample is replaced by its quantized magnitude and phase and provided to the data link 28 for transmission to site 12.

For compressed magnitude and phase, the cross-correlation surface generated in compute correction 104 is calculated as follows:

$$\chi(k,l) = \frac{\max[a]}{N(2^{M_a} - 1)} \sum_1^N \hat{a}(n) e^{j(\hat{\theta}(n)\pi/2^{M_\theta - 1})} \times \bar{s}_1(l \times n - k) e^{-j(b \times n \times \Delta)}$$

The $\tau_{correction}$, $v_{correction}$, and $\phi_{correction}$ are computed as before and transmitted over the link. In this case, max[a] the scaling of the amplitude must be transmitted along with the corrections.

Finally, $\chi_{12}$ is computed as:

$$\chi_{12}(k,l) = \frac{\max[a]}{N(2^{M_a} - 1)} \sum_1^N \hat{a}(n) e^{j(\hat{\theta}(n)\pi/2^{M_\theta - 1})} \times \bar{s}_2(l \times n - k) e^{-j(b \times n \times \Delta)}$$

To use the above described approach where the signal is represented by real and imaginary components, processes 102, 104 and 110 are changed as follows. Let, $$s(n) = R(n) + jQ(n)$$

Then, the real part is quantized as:

$$\hat{R}(n) = \text{sign}(R(n)) \times \text{Integer}\left[(2^{M_R - 1} - 1) \frac{|R(n)|}{\max[R]} + 0.5\right]$$

$$\forall n$$
where $\max[R] = \max\ [|R(n)|]$.

Correspondingly, for the imaginary part, $$\hat{Q}(n) = \text{sign}(Q(n)) \times \text{Integer}\left[(2^{M_Q - 1} - 1) \frac{|Q(n)|}{\max[Q]} + 0.5\right]$$

$$\forall n$$
where $\max[Q] = \max\ [|Q(n)|]$.

For Real/Imaginary compression, the equation used to compute the corrections becomes $$\chi(k,l) = \frac{1}{N} \sum_1^N \left(\frac{\max[R]}{2^{M_R - 1} - 1} \hat{R}(n) + j \frac{\max[Q]}{2^{M_Q - 1} - 1} \hat{Q}(n)\right) \times$$

$$\bar{s}_1(l \times n - k) e^{-j(b \times n \times \Delta)}$$

and $\chi_{12}$ is given by $$\chi_{12}(k,l) = \frac{1}{N} \sum_1^N \left(\frac{\max[R]}{2^{M_R - 1} - 1} \hat{R}(n) + j \frac{\max[Q]}{2^{M_Q - 1} - 1} \hat{Q}(n)\right) \times$$

$$\bar{s}_2(l \times n - k) e^{-j(b \times n \times \Delta)}$$

For real/imaginary compression, both max[R] and max[Q] must be transmitted over the data link 28.

Alternate Embodiment For Real Signal Data

Figure 3:
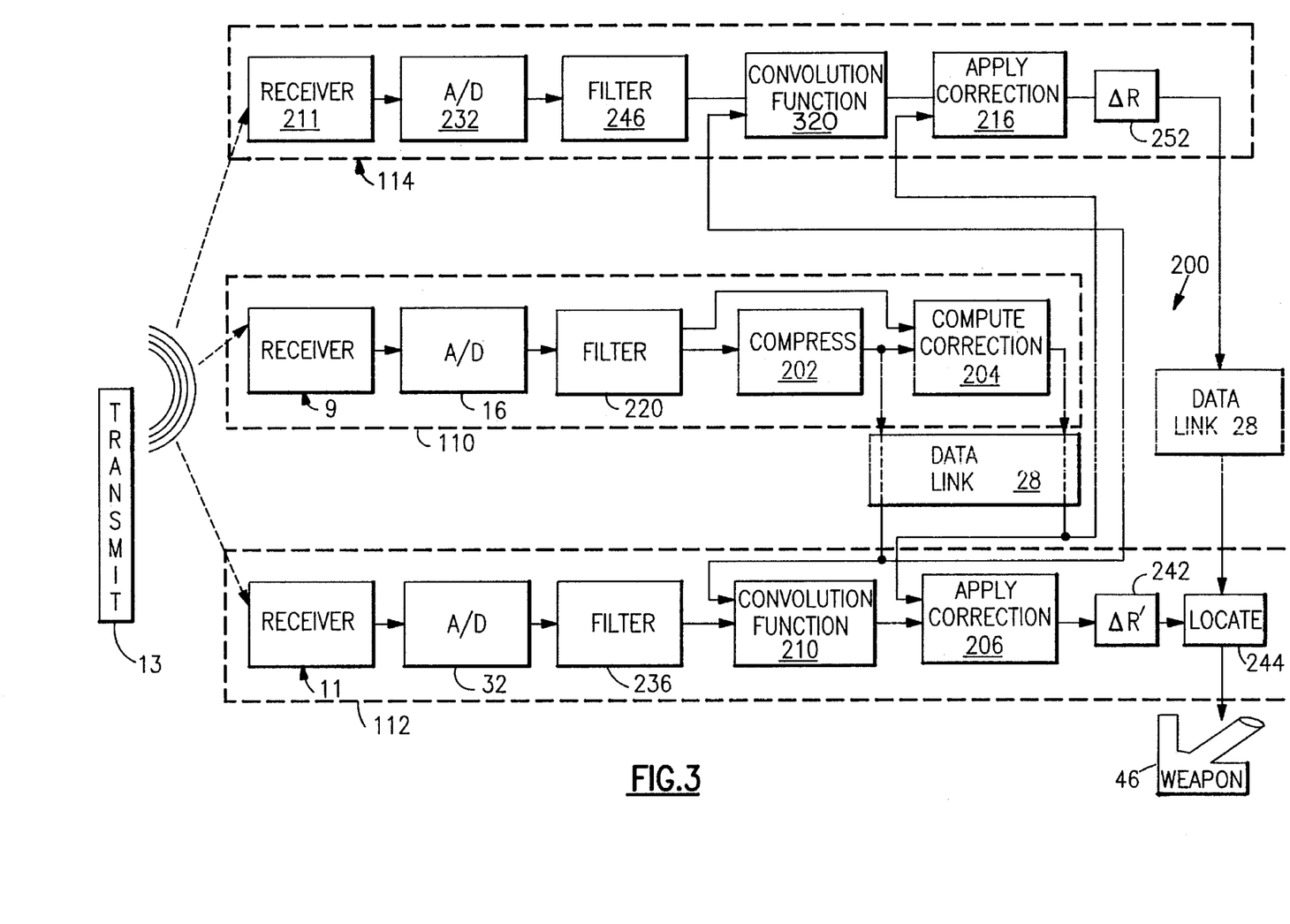
FIG. 3 is a block diagram according to the present invention of a system for determining the location of a transmitter using TDOA from three spaced receiver sites which are all stationary. The transmitter is stationary also.

FIG. 3 illustrates a system generally designated 200 according to the present invention for determining the location of the transmitter 13 when there is no receiver or transmitter motion. Three receiver sites 110, 112 and 114 are required to provide two $\tau$ values. System 200 includes receivers 9 and 11, A/D converters 16 and 32, and data link 28 of prior art FIG. 1. The baseband FIR filters of FIG. 1 are replaced by passband FIR filters 220 and 236. The compression 202, compute correction 204, apply correction 206, convert measurements 242, and locate 244 processes are changed. The third receive site 114 contains receiver 211, A/D converter 232, bandpass FIR 246, convolution 220, apply correction 216, and convert measurement 252 processes. The cross-correlation process 40 is replaced by convolution process 210 using two real signals.

The general strategy of system 200 is as follows. The purpose of the compression process 202 is to reduce the number of bits used to represent the real data resulting after the bandpass FIR filtering process 220, and consequently the amount of data that must be transmitted to sites 112 and 114. As noted previously, the time of transmission from site to site is a limiting factor and data compression can reduce this time considerably.

The preferred embodiment of the compression process 202 is to reduce the number of bits used to represent the real data words. Ultimately, the minimum number of bits that can be used is one. Compression process 202 can be perforated as follows:

$$\hat{s}_1(n) = \text{sign}(s_1(n)) \times \text{Integer}\left[(2^{M_{s_1} - 1} - 1) \frac{|s_1(n)|}{\max[s_1]} + 0.5\right]$$

where $$\max[s_1] = \max_{\forall n}\ [|s_1(n)|]$$

and $s_1$ is the bandpass filtered signal data collected at site 110.

If compression to only a few bits is desired, error correction is necessary because the compression process sacrifices information and thus introduces error in the measured $\tau$. Process 204 determines the correction by convolving the compressed signal data with the actual FIR sampled signal at site 110 as follows:

$$\chi(k) = \frac{1}{N} \frac{\max[s_1]}{2^{M_{s_1} - 1} - 1} \sum_1^N \hat{s}_1(n) \times s_1(l \times n - k)$$

Thus, the data which is transmitted to sites 112 and 114 is not the entire sampled signal received at site 110 but the compressed data and the correction factor for $\tau$.

The compressed signal data is passed to receive sites 112 and 114 via the data link 28. At site 112, the output of the filter 236 and the compressed data from site 110 are convolved 210 as follows:

$$\chi_{12}(k) = \frac{1}{N} \frac{\max[s_1]}{2^{M_{s_1} - 1} - 1} \sum_1^N \hat{s}_1(n) \times s_2(l \times n - k)$$

where $s_2$ is the bandpass filicred signal data collected at site 112. The result is a $\tau$ value representing the difference in delay between sites 110 and 112. However, because of the errors in the data introduced by the compression step, the value for $\tau$ determined by the convolution function requires correction. Thus, apply correction process 206 adds the correction factor for τ received from site 110 to the τ value generated by process 210 at site 112. Then, a process 242 uses the resulting value of τ to determine the difference in range between the transmitter and each receiver site.

At site 114, the output of the filter 246 and the compressed data from site 110 are convolved 220 as follows:

$$\chi_{13}(k) = \frac{1}{N} \frac{\max[s_1]}{2^{M_{s_1}-1} - 1} \sum_1^N \hat{s}_1(n) \times s_3(I \times n - k)$$

where $s_3$ is the bandpass filtered signal data collected at site 114. The result is a τ value representing the difference in delay between sites 110 and 114. However, because of the errors in the data introduced by the compression step, the value for τ determined by the convolution function requires correction. Thus, apply correction process 216 adds the correction factor for τ received from site 110 to the τ value generated by process 220 at site 114. Then, a process 252 uses the resulting value of τ to determine the difference in range between the transmitter and each receiver site. The ΔR is transmitted via the data link 28 to site 112. Then, a process 244 at site 112 determines the intersection of the two contours corresponding to these two differences and that is the location of the transmitter.

Applications

There are many applications for the present invention. For example, the transmitter may be a radio or microwave transmitter, in which case, each of the receivers comprises a radio or microwave antenna and amplifier. In wartime, the transmitter may be operated by the enemy and attacked with a weapon 46 after being located. As another example, the transmitter can be a propeller of a submarine or ship generating an acoustic or sonic wave in which case, each of the receivers comprises a transducer to convert the acoustic or sonic signal to an electrical signal. In this latter example, the receivers can be located in other submarines or ships or in a buoy dragged by a helicopter. Then, the submarine can be tracked, and in wartime attacked with a weapon 46.

However, the present invention may also be useful in other, commercial applications, such as seismology to locate an oil or mineral deposit. In such an application, the transmitter comprises sonic reflections from the oil or mineral deposit due to man-made surface shocks at more than one location. The oil or mineral deposit is located using several receivers which are sonic to electrical transducers. After the oil or mineral deposit is located, a drilling operation follows.

Based on the foregoing, systems and processes for locating a transmitter have been disclosed. However, numerous modifications and substitutions can be made without deviating from the scope of the present invention. For example, different approaches for compressing the data can be used. Therefore, the present invention has been disclosed by way of illustration and not limitation, and reference should be made to the following claims to determine the scope of the present invention.

I claim:

1. A process for locating a transmitter, said process comprising the steps of:

receiving at a first receiver a signal transmitted by said transmitter;

analog to digital converting the signal received by said first receiver to yield a first digital signal;

compressing the first digital signal or another digital signal derived from said first digital signal;

receiving at a second receiver the signal transmitted by said transmitter, wherein there is relative motion between said first or second receiver and said transmitter;

analog to digital converting the signal received by said second receiver to yield a second digital signal;

transmitting the compressed signal to a cross-correlation unit local to said second receiver and coupled also to receive said second digital signal or another digital signal derived from said second digital signal;

using said cross-correlation unit to generate and solve a cross-correlation function based on said compressed signal and said second digital signal or other digital signal derived from said second digital signal; and determining, locally to said first receiver, correction factors for the solution to the cross-correlation function, and transmitting said correction factors to a correction unit which applies said correction factors to the solution of said cross-correlation function.

2. A process as set forth in claim 1 wherein said compressing step represents said first digital signal or said other digital signal derived from said first digital signal by phase information comprising substantially fewer bits than the phase information before the compressing step.

3. A process as set forth in claim 1 further comprising the steps of:

finite impulse response filtering said first digital signal or said other digital signal derived from said first digital signal; and finite impulse response filtering said second digital signal or said other digital signal derived from said second digital signal.

4. A process as set forth in claim 3 wherein said cross-correlation function is defined by $$\chi_{12}(k,l) = \frac{1}{N} \sum_1^N e^{j(\hat{\theta}(n)\pi/2^{M_\theta - 1})} \times \bar{s}_2(I \times n - k) e^{-j(l \times n \times \Delta)}$$

where $e^{j(\hat{\theta}(n)\pi/2^{M_\theta-1})}$ is the quantized phase representation of the compressed signal, $\bar{s}_2$ represents the conjugate of the output of the finite impulse response filtering step of said second digital signal or said other digital signal derived from said second digital signal, n is the complex sample index, k is the τ index, Δ is the Fourier Transform angle increment and l is the ν index.

5. A process as set forth in claim 3 wherein said correction factors are defined by $$\chi(k,l) = \frac{1}{N} \sum_1^N e^{j(\hat{\theta}(n)\pi/2^{M_\theta - 1})} \times \bar{s}_1(I \times n - k) e^{-j(l \times n \times \Delta)}$$

where $e^{j(\hat{\theta}(n)\pi/2^{M_\theta-1})}$ is the quantized phase representation of the compressed signal, $\bar{s}_1$ represents the conjugate of the output of the finite impulse response filtering of said first digital signal or said other digital signal derived from said first digital signal, n is the complex sample index, k is the τ index ($-2 \leq k \leq 2$), Δ is the Fourier Transform angle increment and l is the ν index ($-2 \leq l \leq 2$).

6. A process as set forth in claim 1 wherein said compressing step is performed by $$\hat{\theta} = \text{sign}(\theta) \times \text{Integer}\left[\frac{|\theta| \times 2^{M_\theta - 1}}{\pi} + 0.5\right];$$

if $\hat{\theta} = 2^{M_\theta - 1}$, then $\hat{\theta} = -2^{M_\theta - 1}$.

where $M_\theta$ ($\geq 1$) is the number of bits used to represent each θ.

7. A process as set forth in claim 3 wherein said cross-correlation step is defined by $$\chi_{12}(k,l) = \frac{\max[a]}{N(2^{M_a}-1)} \sum_{1}^{N} \hat{a}(n)e^{j(\hat{\theta}(n)\pi/2^{M_\theta-1})} \times \bar{s}_2(l \times n - k)e^{-j(l \times n \times \Delta)}$$

where $$\frac{\max[a]}{N(2^{M_a}-1)} \hat{a}(n)e^{j(\hat{\theta}(n)\pi/2^{M_\theta-1})}$$

is the quantized magnitude and phase representation of the compressed signal, $\bar{s}_2$ represents the conjugate of the output of the finite impulse response filtering step of said second digital signal or said other digital signal derived from said second digital signal, n is the complex sample index, k is the $\tau$ index, $\Delta$ is the Fourier Transform angle increment and l is the $\nu$ index.

8. A process as set forth in claim 3 wherein said correction factors are defined by $$\chi(k,l) = \frac{\max[a]}{N(2^{M_a}-1)} \sum_{1}^{N} \hat{a}(n)e^{j(\hat{\theta}(n)\pi/2^{M_\theta-1})} \times \bar{s}_1(l \times n - k)e^{-j(l \times n \times \Delta)}$$

where $$\frac{\max[a]}{N(2^{M_a}-1)} \hat{a}(n)e^{j(\hat{\theta}(n)\pi/2^{M_\theta-1})}$$

is the quantized magnitude and phase representation of the compressed signal, $\bar{s}_1$ represents the conjugate of the output of the finite impulse response filtering of said first digital signal or said other digital signal derived from said first digital signal, n is the complex sample index, k is the $\tau$ index ($-2 \leq k \leq 2$), $\Delta$ is the Fourier Transform angle increment and l is the $\nu$ index ($-2 \leq l \leq 2$).

9. A process as set forth in claim 1 wherein said compressing step is performed by $$\hat{a}(n) = \text{Integer}\left[\frac{a(n) \times (2^{M_a}-1)}{\max[a]} + 0.5\right]$$

where $a(n)$ is the signal amplitude, $\max[a] = \overset{\forall n}{\max}[a(n)]$, and $M_a$, ($\geq 1$) is the number of bits used to represent each a; and $$\hat{\theta} = \text{sign}(\theta) \times \text{Integer}\left[\frac{|\theta| \times 2^{M_\theta-1}}{\pi} + 0.5\right];$$

if $\hat{\theta} = 2^{M_\theta-1}$, then $\hat{\theta} = -2^{M_\theta-1}$.

where $M_\theta$ ($\geq 1$) is the number of bits used to represent each $\theta$.

10. A process as set forth in claim 3 wherein said cross-correlation step is defined by $$\chi_{12}(k,l) = \frac{1}{N} \sum_{1}^{N} \left(\frac{\max[R]}{2^{M_R-1}-1} \hat{R}(n) + j \frac{\max[Q]}{2^{M_Q-1}-1} \hat{Q}(n)\right) \times \bar{s}_2(l \times n - k)e^{-j(l \times n \times \Delta)}$$

where $$\frac{\max[R]}{2^{M_R-1}-1} \hat{R}(n) + j \frac{\max[Q]}{2^{M_Q-1}-1} \hat{Q}(n)$$

is the quantized real and imaginary representation of the compressed signal, $\bar{s}_2$ represents the conjugate of the output of the finite impulse response filtering step of said second digital signal or said other digital signal derived from said second digital signal, n is the complex sample index, k is the $\tau$ index, $\Delta$ is the Fourier Transform angle increment and l is the $\nu$ index.

11. A process as set forth in claim 3 wherein said correction factors are defined by $$\chi(k,l) = \frac{1}{N} \sum_{1}^{N} \left(\frac{\max[R]}{2^{M_R-1}-1} \hat{R}(n) + j \frac{\max[Q]}{2^{M_Q-1}-1} \hat{Q}(n)\right) \times \bar{s}_1(l \times n - k)e^{-j(l \times n \times \Delta)}$$

where $$\frac{\max[R]}{2^{M_R-1}-1} \hat{R}(n) + j \frac{\max[Q]}{2^{M_Q-1}-1} \hat{Q}(n)$$

is the quantized real and imaginary representation of the compressed signal, $\bar{s}_1$ represents the conjugate of the output of the finite impulse response filtering of said first digital signal or said other digital signal derived from said first distal signal, n is the complex sample index, k is the $\tau$ index ($-2 \leq k \leq 2$), $\Delta$ is the Fourier Transform angle increment and l is the $\nu$ index ($-2 \leq l \leq 2$).

12. A process as set forth in claim 1 wherein said compressing step is performed by $$\hat{R}(n) = \text{sign}(R(n)) \times \text{Integer}\left[(2^{M_R-1}-1)\frac{|R(n)|}{\max[R]} + 0.5\right]$$

where $$\max[R] = \overset{\forall n}{\max}[|R(n)|]$$

and $M_R$ is the number of bits used to represent the real part; and $$\hat{Q}(n) = \text{sign}(Q(n)) \times \text{Integer}\left[(2^{M_Q-1}-1)\frac{|Q(n)|}{\max[Q]} + 0.5\right]$$

where $$\max[Q] = \overset{\forall n}{\max}[|Q(n)|]$$

and $M_Q$ is the number of bits used to represent the imaginary part.

13. A process as set forth in claim 1 further comprising the steps of:
   converting said first digital signal to a complex baseband signal, the compressing step being performed using said complex baseband signal or a digital signal derived from said complex baseband signal; and
   converting said second digital signal to a complex baseband signal, the cross-correlation function being performed using said complex baseband signal or a digital signal derived from said complex baseband signal.

14. A process as set forth in claim 13 further comprising the steps of:
   finite impulse response filtering said complex baseband signal derived from said first digital signal and performing the compression step and correction computation using the finite impulse response filtered signal; and
   finite impulse response filtering said complex baseband signal derived from said second digital signal and performing the cross-correlation function generating step using the finite impulse response filtered signal.

15. A process as set forth in claim 1 wherein said cross-correlation function generating step yields a difference in time delay, difference in frequency and difference in phase between the signal received at said first receiver and the signal received at said second receiver.

16. A process as set forth in claim 15 further comprising the subsequent steps of determining the location of said transmitter based on the corrected solution to said cross-correlation function.

17. A process as set forth in claim 16 wherein the determining step is performed by determining the difference in range between said transmitter and each of said receivers and the difference in velocity between said receivers.

18. A process as set forth in claim 1 wherein said transmitter transmits radio or microwave signals, and said receivers receives said radio or microwave signals with an antenna and amplifier.

19. A process as set forth in claim 1 wherein said correction unit is local to said second receiver.

20. A process as set forth in claim 1 wherein both of said receivers are moving.

21. A process as set forth in claim 1 wherein said transmitter transmits acoustic, sonic or ultrasonic waves and each of said receivers transduces said acoustic, sonic or ultrasonic waves to a corresponding electrical signal.

22. A process as set forth in claim 1 wherein said phase information indicates only a quadrant in a complex plane in which the phase of each digital sample resides.

23. A process as set forth in claim 16 further comprising the subsequent step of supplying said location information to a weapon control system and processing said location information by said weapon control system.

24. A process for locating a transmitter, said process comprising the steps of:
   receiving at a first receiver a signal transmitted by said transmitter;
   analog to digital converting the signal received by said first receiver to yield a first digital signal;
   compressing said first digital signal or another digital signal derived from said first digital signal;
   receiving at a second receiver the signal transmitted by said transmitter;
   analog to digital converting the signal received by said second receiver to yield a second digital signal;
   receiving at a third receiver a signal transmitted by said transmitter;
   analog to digital converting the signal received by said third receiver to yield a third digital signal;
   transmitting the compressed signal to a convolution unit local to said second receiver and convolving said compressed signal with said second digital signal or another digital signal derived from said second digital signal;
   transmitting said compressed signal to a convolution unit local to said third receiver and convolving said compressed signal with said third digital signal or another digital signal derived from said third digital signal;
   determining, locally to said first receiver, correction factors for the solution to both convolution units, transmitting said correction factors to a correction unit local to said second receiver which applies said correction factors to an output of the convolution unit local to said second receiver, and transmitting said correction factors to a correction unit local to said third receiver which applies said correction factors to an output of the convolution unit local to said third receiver.

25. A process as set forth in claim 24 further comprising the steps of:
   determining a time difference of arrival between the signals received at said first and third receivers based on the output of said correction unit which is local to said third receiver; and
   determining a time difference of arrival between the signals received at said first and second receivers based on the output of said correction unit which is local to said second receiver.

26. A process as set forth in claim 25 further comprising the step of determining the location of the transmitter based on the two time difference of arrival measurements.

27. A process as set forth in claim 24 wherein said compressing step represents said first digital signal or said other digital signal derived from said first digital signal by information comprising substantially fewer bits than the information before the compressing step.

28. A process as set forth in claim 24 further comprising the steps of:
   filtering said first digital signal; and
   filtering said second digital signal.

29. A process as set forth in claim 28 wherein each of said convolution units performs the function of $$\chi_{1i}(k) = \frac{1}{N} \frac{\max[s_1]}{2^{M_{s1}-1} - 1} \sum_{1}^{N} \hat{s}_1(n) \times s_i(I \times n - k)$$

where $$\frac{\max[s_1]}{2^{M_{s1}-1} - 1} \hat{s}_1(n)$$

is the quantized representation of the compressed signal, $s_i$ represents the output of the filtering step of the ith (second or third) digital signal or said other digital signal derived from said ith digital signal, n is the sample index, and k is the $\tau$ index.

30. A process as set forth in claim 28 wherein said correction factors are defined by $$\chi(k) = \frac{1}{N} \frac{\max[s_1]}{2^{M_{s1}-1} - 1} \sum_{1}^{N} \hat{s}_1(n) \times s_1(I \times n - k)$$

where $$\frac{\max[s_1]}{2^{M_{s1}-1} - 1} \hat{s}_1(n)$$

is the quantized representation of the compressed signal, $s_i$ represents the output of the filtering of said first distal signal or said other digital signal derived from said first digital signal, n is the sample index, and k is the $\tau$ index ($-2 \leq k \leq 2$).

31. A process as set forth in claim 24 wherein said compressing step is performed by $$\hat{s}(n) = \text{sign}(s(n)) \times \text{Integer}\left[ (2^{M_s-1} - 1) \frac{|s(n)|}{\max[s]} + 0.5 \right]$$

where $M_s$ ($\geq 1$) is the number of bits used to represent each s.

32. A process as set forth in claim 26 further comprising the subsequent step of supplying said location information to a weapon control system and processing said location information by said weapon control system.

33. A system for locating a transmitter, said system comprising:
   a first receiver for receiving a signal transmitted by said transmitter;

a first analog to digital converter for converting the signal received by said first receiver to yield a first digital signal;

means for compressing the first digital signal or another digital signal derived from said first digital signal;

a second receiver for receiving the signal transmitted by said transmitter, wherein there is relative motion between said first or second receiver and said transmitter;

a second analog to digital converter for converting the signal received by said second receiver to yield a second digital signal;

a cross-correlation unit local to said second receiver and coupled to receive said second digital signal or another digital signal derived from said second digital signal;

means for transmitting the compressed signal to said cross-correlation unit, said cross-correlation unit generating and solving a cross-correlation function based on said compressed signal and said second digital signal or other distal signal derived from said second digital signal;

a correction unit; and means for determining, locally to said first receiver, correction factors for the solution to the cross-correlation function, and transmitting said correction factors to said correction unit which applies said correction factors to the solution of said cross-correlation function.

34. A system for locating a transmitter, said system comprising:

a first receiver for receiving a signal transmitted by said transmitter;

a first analog to digital converter for converting the signal received by said first receiver to yield a first digital signal;

means for compressing said first digital signal or another digital signal derived from said first digital signal;

a second receiver for receiving the signal transmitted by said transmitter;

a second analog to digital converter for converting the signal received by said second receiver to yield a second digital signal;

a third receiver for receiving a signal transmitted by said transmitter;

a third analog to digital converter for converting the signal received by said third receiver to yield a third digital signal;

a first convolution unit local to said second receiver;

means for transmitting the compressed signal to said first convolution unit and convolving said compressed signal with said second digital signal or another digital signal derived from said second digital signal;

a second convolution unit local to said third receiver;

means for transmitting said compressed signal to said second convolution unit and convolving said compressed signal with said third digital signal or another digital signal derived from said third digital signal;

a first correction unit local to said second receiver;

a second correction unit local to said third receiver;

means for determining, locally to said first receiver, correction factors for the solution to both convolution units, transmitting said correction factors to said first correction unit which applies said correction factors to an output of said first convolution unit and transmitting said correction factors to said second correction unit which applies said correction factors to an output of said second convolution unit.

35. A system as set forth in claim 33 wherein the compressing means is local to said first receiver.

* * * * *